(12) United States Patent
Shih

(10) Patent No.: US 7,796,122 B2
(45) Date of Patent: Sep. 14, 2010

(54) TOUCH CONTROL DISPLAY SCREEN WITH A BUILT-IN ELECTROMAGNET INDUCTION LAYER OF SEPTUM ARRAY GRIDS

(75) Inventor: Hsuan-Ming Shih, Chungli (TW)

(73) Assignee: Taiguen Technology (Shen_Zhen) Co., Ltd., Shenzhen (CN)

( * ) Notice: Subject to any disclaimer, the term of this patent is extended or adjusted under 35 U.S.C. 154(b) by 1289 days.

(21) Appl. No.: 10/500,438

(22) PCT Filed: Sep. 27, 2002

(86) PCT No.: PCT/CN02/00687

§ 371 (c)(1),
(2), (4) Date: Jun. 28, 2004

(87) PCT Pub. No.: WO03/056422

PCT Pub. Date: Jul. 10, 2003

(65) Prior Publication Data

US 2005/0062725 A1 Mar. 24, 2005

(30) Foreign Application Priority Data

Dec. 29, 2001 (CN) ............... 01 2 79677 U
Sep. 16, 2002 (CN) ............... 02 2 57335 U

(51) Int. Cl.
*G09G 5/00* (2006.01)
(52) U.S. Cl. .......................... 345/173; 178/19
(58) Field of Classification Search ........... 345/173, 345/174, 178, 179, 156; 178/18.03, 18.07, 178/19; 341/20; 343/867
See application file for complete search history.

(56) References Cited

U.S. PATENT DOCUMENTS

| | | | | | |
|---|---|---|---|---|---|
| 4,933,544 | A | * | 6/1990 | Tamaru | 250/221 |
| RE33,740 | E | * | 11/1991 | Taguchi et al. | 178/18.07 |
| 5,381,160 | A | * | 1/1995 | Landmeier | 345/174 |
| 5,428,417 | A | * | 6/1995 | Lichtenstein | 353/122 |
| 6,137,427 | A | * | 10/2000 | Binstead | 345/173 |
| 6,249,234 | B1 | * | 6/2001 | Ely et al. | 341/20 |

(Continued)

*Primary Examiner*—Amare Mengistu
*Assistant Examiner*—Yuk Chow
(74) *Attorney, Agent, or Firm*—J.C. Patents

(57) ABSTRACT

A touch control display screen with built-in membrane antenna array lattice electromagnetic induction layer, including at least a display screen and a shell; wherein an induction layer is provided in the rear of the display screen, the output of the induction layer is connected to an induction control circuit, a display screen control circuit is also provided in the shell; the induction layer is the antenna array printed on the insulation membrane and arranged along the X, Y axes, therein the area enclosed by each lattice unit constitutes one induction cell. Because the electromagnetic induction layer is provided in the rear of the display screen and flexible membrane-type, printed electromagnetic induction array antenna is used as the identifying induction component according to the present invention, the manufacture is easy, the cost is low, and the advantage in cost-cut is prominent in comparison with the prior art when the area of the display screen is larger. The accuracy of identification is high, and the mouse information or handwriting information can be input exactly by means of brush strokes of finger strokes; as a touch screen, the display screen is covered by a protecting film to avoid the physical damage, so it has long operating life.

10 Claims, 5 Drawing Sheets

U.S. PATENT DOCUMENTS

| | | | |
|---|---|---|---|
| 6,417,813 B1 * | 7/2002 | Durham .................... | 343/753 |
| 6,434,403 B1 * | 8/2002 | Ausems et al. ........... | 455/556.2 |
| 6,661,409 B2 * | 12/2003 | Demartines et al. ......... | 345/173 |
| 7,084,933 B2 * | 8/2006 | Oh et al. .................... | 349/12 |
| 7,113,175 B2 * | 9/2006 | Liu et al. .................... | 345/173 |
| 2002/0000977 A1 * | 1/2002 | Vranish ..................... | 345/173 |
| 2002/0063694 A1 * | 5/2002 | Keely et al. ................ | 345/173 |
| 2003/0122774 A1 * | 7/2003 | Harada ...................... | 345/156 |
| 2004/0239642 A1 * | 12/2004 | Shi et al. .................... | 345/173 |

* cited by examiner

TOUCH CONTROL DISPLAY SCREEN WITH A BUILT-IN ELECTROMAGNET INDUCTION LAYER OF SEPTUM ARRAY GRIDS

TECHNIQUE FIELD

The present invention relates to a touch screen, particularly to a touch control display screen with built-in membrane antenna array lattice electromagnetic induction layer, and the present invention belongs to the field of the electronic technology.

BACKGROUND ART

More and more ways to transform information to electronic form and digital form come forth along with wide application of the computer technology. Various peripheral of computer are used, and various method for digitalization in beginning of information processing procedure. For example, there are various methods for keyboard input, voice input, image pickup and so on, wherein the most effective and convenient one is that the information input and command calling are performed by means of touching or clicking etc. directly on a display screen. As painting and drawing by using a computer, the mouse operation is not agile as same as hand-writing and hand-drawing on paper by using a pen, so it is hard to complete expertly a delicate and beautiful pattern or picture. However, by using a touch screen, the direct operation on the display screen by a touch control pen is just as same as drawing on a paper, therefore the whole work procedure is very easy to be completed with good effect. Furthermore, various peripherals, such as keyboard and mouse, are all omitted along with the continuous development of the portable product. For example, there is substantially no operation of keystroke in use of the PDA (personal digital assistant), but various operations are all completed by using a touch control pen and a touch screen.

Traditional touch-control panels are mainly those with resistance-induction method. With regard to the concrete configuration, a transparent touch film is provided outside the display screen, and is coated with a resistance layer on its surface. When a specific position on the touch film is clicked in the operating procedure, then the identification control circuit determines the position coordinates of the click by calculating the potential shift in this position, thereby performs respective operation. However, the existing touch screen is not applied widely, because of the following disadvantages: high cost, complex process, low accuracy in the case of large-sized touch-control panel; inconformity for handwriting input; and physical damage such as abrasion by a plurality of operations, which will reduce the operating life of the touch film.

SUMMARY OF THE INVENTION

The object of the present invention is to overcome the disadvantages of the prior art, to provide an touch control display screen with built-in membrane antenna array lattice electromagnetic induction layer, which has the advantages of lower cost, simple manufacture procedure, high accuracy of identification-collection and long operating life.

The object of the present invention is achieved by the following technical solution:

A touch control display screen with built-in membrane antenna array lattice electromagnetic induction layer, including at least a display screen and a shell; wherein an induction layer is provided in the rear of the display screen, the output of the induction layer is connected to an induction control circuit, a display screen control circuit is also provided in the shell; the said induction layer may be the antenna array provided on the insulation membrane and arranged along the X, Y axes, therein the area enclosed by each lattice unit constitutes one electromagnetic induction cell.

A shield layer is provided after the induction layer for enhancing the anti-interference ability of the device; a buffering layer is provided between induction layer and shield layer.

A space is provided between the shield layer and the display screen control circuit.

The induction layer may be the antenna array formed by the silver-plasm or the mixture material of the silver-plasm and the carbon-plasm which is printed on the insulation membrane. The induction layer can be printed on two surfaces of the insulation membrane, or printed on one surface of the insulation membrane, and there are two layers of insulation membrane in which one is overlaid on the other.

The insulation membrane may be film material in order to cut the cost.

In order to improve the accuracy of induction of the induction layer, two or more induction layers are overlaid together and the induction cells on respective induction layers are set to interlace with each other. The interval sizes of the induction cells on respective layers may be same or different.

The components of the induction control circuit are mounted on a printed substrate which is separated from the induction layer, the output of the antenna array of the induction layer is connected to the corresponding input terminal on the printed substrate by means of pressure-connection, plug-in connection or welding-connection. The output of the antenna array of the induction layer is positioned between a hard sheet and a printed substrate. A buffering layer is provided between the hard sheet and the output of the antenna array; the hard sheet, buffering layer and the output of the antenna array are overlaid on the printed substrate by means of the screwing-conjunction; the output of the antenna array is connected with corresponding input terminal on the printed substrate.

The printed substrate may be the printed substrate of the display screen control circuit in the body of the display screen, or may be the printed substrate may be the printed substrate of the display screen control circuit outside the body of the display screen, or a self contained unit, otherwise it may be set on the main board of PC. The connection between them is achieved by line or cable.

The induction control circuit is positioned outside the body, and connected to the body through the electrical connection means. The output of the antenna array of the induction layer is connected with the output interface of the induction layer by means of pressure connection, plug-in connection, or welding-connection. On the control circuit, an interface which can match the electrical connection means of the induction layer is provided.

The output interface of the induction layer and the interface of the control circuit may be one of the following: pin-type connection means, flexible printed circuitry means, PIN-PIN connection means, welding spot (VGA) thermal-melted connection means, ultrasonic welding device, solder-plate welding device, puncture-type connection means.

A protecting layer is provided in front of the display screen. The display screen is a plasma display screen or a liquid crystal panel.

After studying of the above-mentioned technical solutions, it is known that the present invention possesses the following advantages:

Because the electromagnetic induction layer is provided in the rear of the display screen and flexible membrane-type, printed electromagnetic induction array antenna is used as the identifying induction component, the manufacture is easy, the cost is low, and the advantage in cost-cut is prominent in comparison with the prior art when the area of the display screen is larger.

Because the electromagnetic induction array antenna is used as the component of induction, the accuracy of identification is high, and the mouse information or handwriting information can be input exactly by means of brush strokes of finger strokes.

Because the electromagnetic induction layer positioned in the rear of the display screen generates the signal, and the display screen as the touch screen is covered by a protecting film to avoid the physical damage, so it has long operating life.

MODE OF CARRYING OUT THE INVENTION

The present invention will be explained in detail with reference to the drawings.

Figure 1:
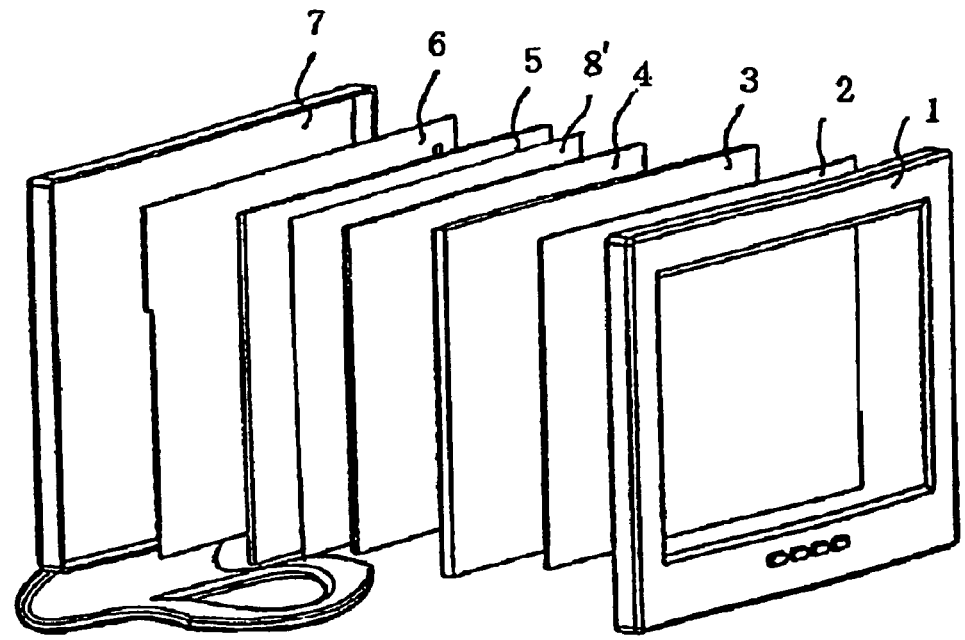
FIG. 1 is a diagram showing the structure of an embodiment according to the present invention.

As shown in FIG. 1, a touch control display screen with built-in membrane antenna array lattice electromagnetic induction layer according to the present invention includes at least display screen 3 and shell 1, 7; wherein an induction layer 4 is provided in the rear of the display screen 3, the output of the induction layer 4 is connected to an induction-collection control circuit, a display screen control circuit is also provided in the shell 1, 7. The display screen 3 is a plasma display screen, a liquid-crystal display screen or other flat display screen.

According to the present invention, the induction layer 4 is provided after the display screen 3, and the induction layer 4 can also induce the touch position of the handwriting through the display screen. With respect to the concrete configuration, the area of the induction layer 4 is same as the area of the display screen 3. A shield layer 5 is provided after the induction layer 4, and a display screen control circuit 6 is provided after the shield layer 5. The shield layer 5 is insulated and shielded with induction layer 4 and display screen control circuit 6 respectively. Certainly, the shield layer 5 and the display screen control circuit 6 may be provided in other space of the display screen or main unit. However, the conjunction of the shield layer 5 with the display screen control circuit 6 and induction layer 4 by means of overlaying each other is advantageous to concentrate the whole induction device. A space is provided between the shield layer 5 and display screen control circuit 6, in order to further ensure the shield effect. Certainly, in the case that the space is kept between the shield layer 5 and the induction layer 6, there is already the insulation effect, whereby the shield layer 5 can has no insulating layer material thereon. The shield layer 5 is used to enhance the anti-interference ability of the device.

Furthermore, a transparent protecting layer or a protecting film 2 is provided in the front of the display screen 3, in order to improve anti-wear performance of the surface of the display screen 3 and so on.

Further, a buffering layer 8' is provided between the induction layer 4 and the shield layer 5, or a buffering layer 8' is provided between the induction layer 4 and the shield layer 5. The buffering layer is used to keep a reasonable space between the induction layer 4 and the shield layer 5. Furthermore, the electromagnetic signal is transmitted from the pen in the both cases that the pen is pressed down and the pen is not pressed down, so as to control conveniently. Certainly, in a modification of the invention, the electromagnetic signal is not transmitted in the case that the pen is not pressed down. Furthermore, the pen can be provided with pressure induction means in order to sensing the pressure by using different frequency.

Figure 2:
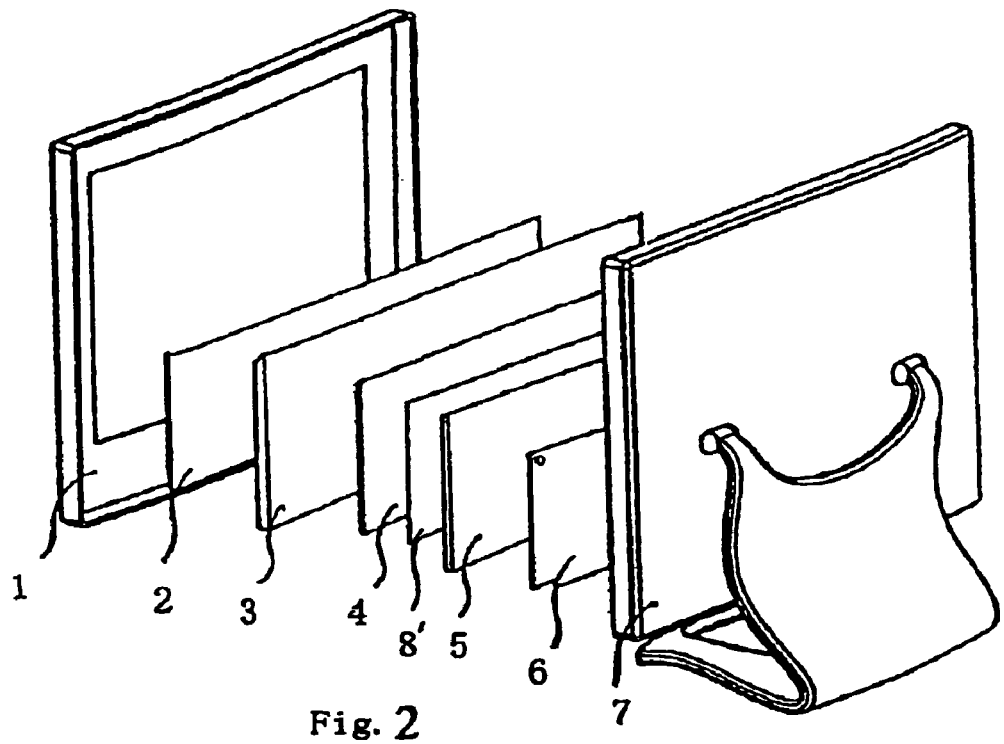
FIG. 2 is a diagram showing the structure of another embodiment according to the present invention.

As shown in FIG. 2, according to different requirement, for example, in the case that a part of the display screen 3 is used as the touch input region or touch operation region, the area of the induction layer 4 may be smaller than the area of the display screen 3, and the induction layer 4 may be positioned in one or two or four sides of the display screen 3. Certainly, the area of the induction layer 4 may be larger than the area of the display screen 3, so the whole display screen 3 and the periphery of the display screen 3 possess the capability of touch-operation.

Figure 3:
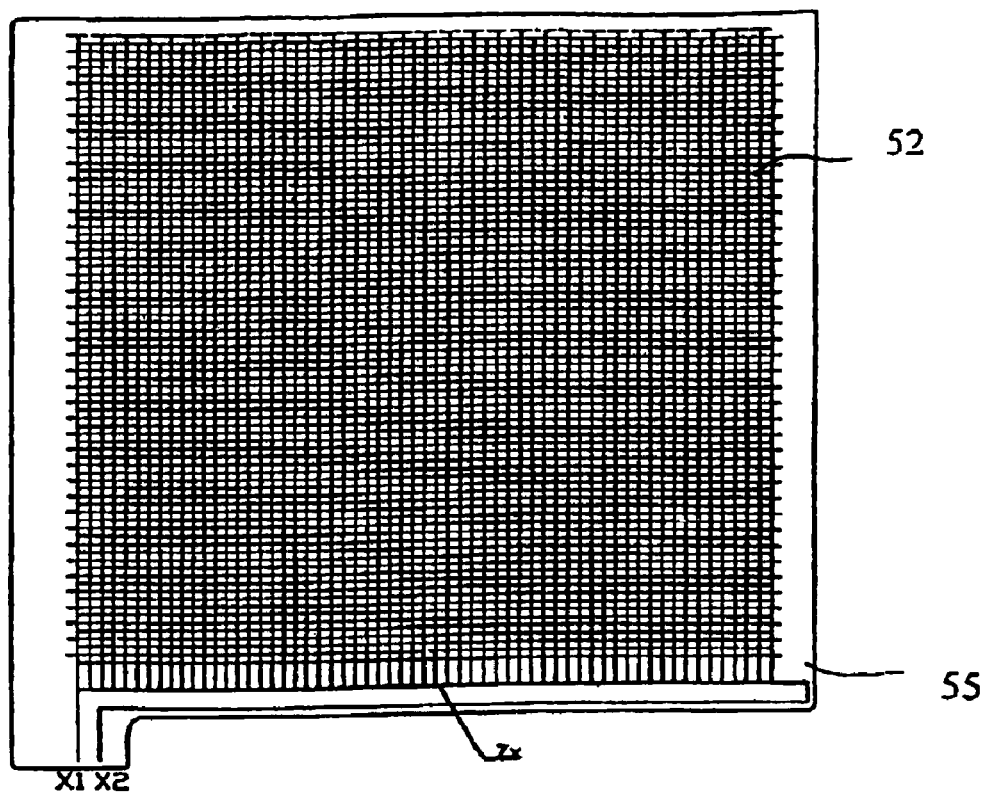
FIG. 3 is a diagram showing the structure of the antenna array of the induction layer in the present invention, which is etched or printed along X-axis.
Figure 4:
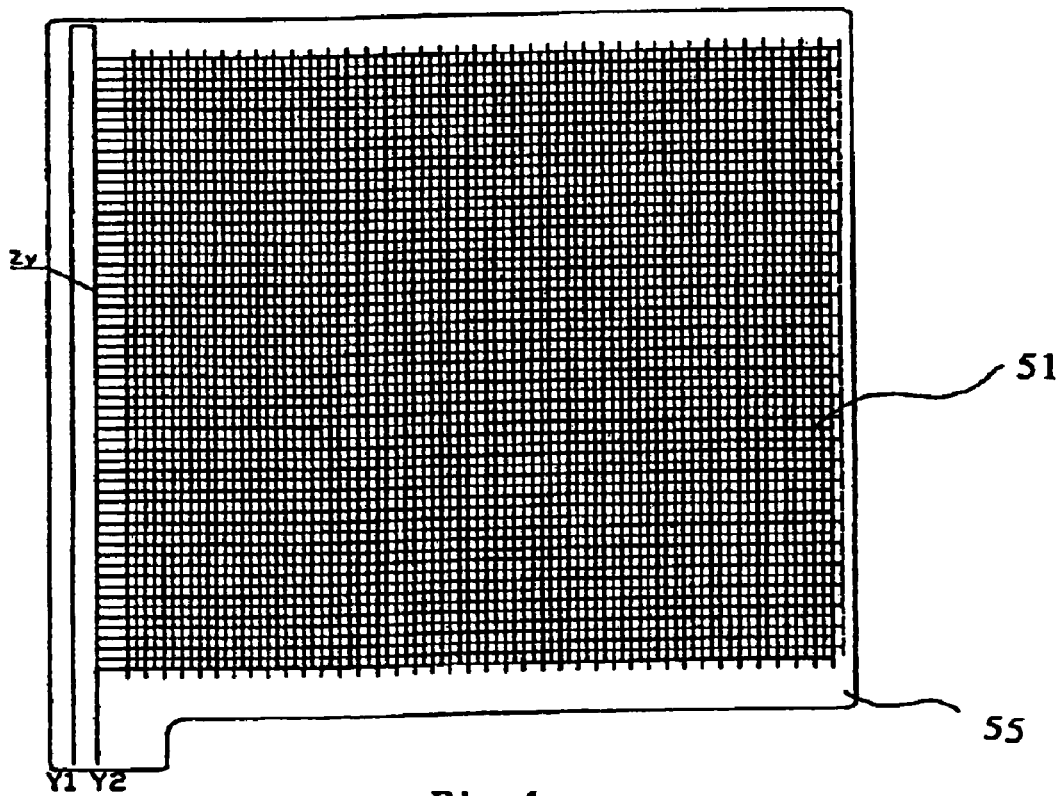
FIG. 4 is a diagram showing the structure of the antenna array of the induction layer in the present invention, which is etched or printed along Y-axis.
Figure 5:
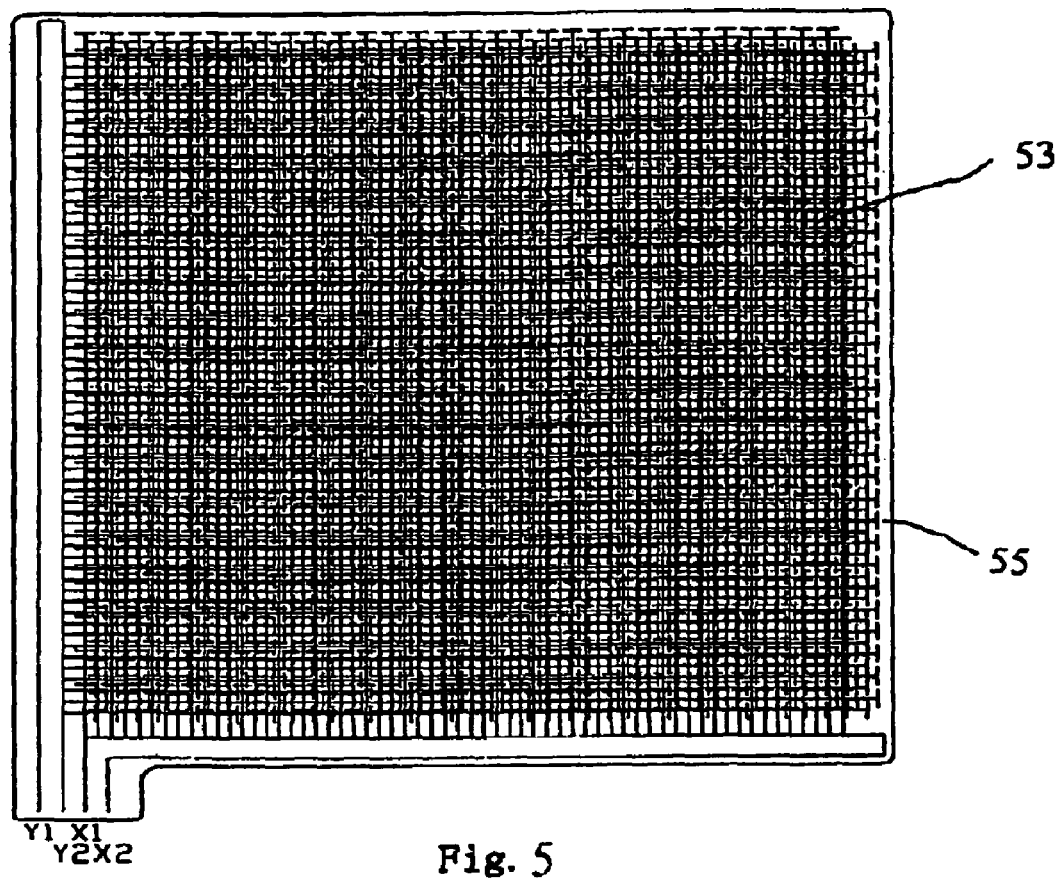
FIG. 5 is a diagram showing massive structure of the induction cells formed by the X-Y directional antenna array of the induction layer in the present invention.

As shown in FIGS. 3, 4 and 5, the induction layer 4 may be the antenna array 52, 51 printed on the insulation membrane 55 and arranged along the X, Y axes, therein the area enclosed by each lattice unit constitutes one induction cell 53. The insulation membrane 55 may be film material in order to cut the cost. The induction layer 5 may be the antenna array formed by etching the copper-platinum covering the insulation membrane 55, may be the antenna array formed by flexible printed circuitry (FPC), and may be the antenna array formed by the silver-plasm or the mixture material of the silver-plasm and the carbon-plasm which is printed on the insulation membrane.

The induction layer can be printed on two surfaces of the insulation membrane, or printed on one surface of the insulation membrane, and there are two layers of insulation membrane in which one is overlaid on the other.

Figure 6:
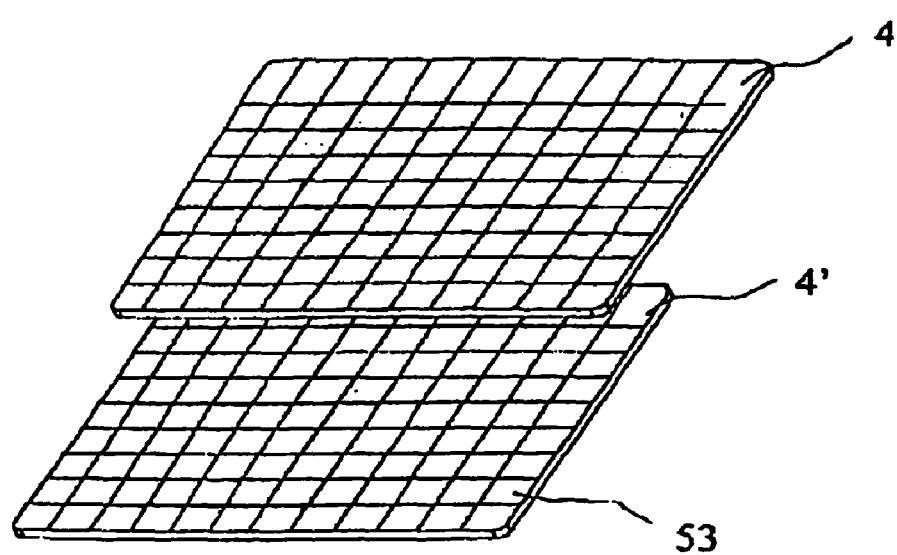
FIG. 6 is a diagram showing the structure of two induction layers overlaid one by one according to the present invention.

As shown in FIG. 6, two or more induction layers 4 and 4' are overlaid together and the induction cells 53 on each induction layer are set to interlace each other, so as to improve the accuracy of the touch screen. The interval sizes of the said induction cells on respective layers may be same or different. After the induction layers that each layer has different interval size of the induction cells 53 are overlaid together, the scale unit of the coordinates is consequentially shorten, so the accuracy of induction is improved. In the case that the induction layers having same size of the induction cells 53 are overlaid together, because the induction cells 53 on different induction layers are set to interlace each other, the scale unit of the coordinates can also be shorten, and so the sensitivity of the electronic white board is improved.

The induction-collection control circuit of the induction layer 4 and the output of the antenna array of the induction layer are integrated by direct connection, the components of the induction-collection control circuit are positioned on the output terminal of the antenna array, and the induction-collection control circuit is positioned in the shell. For example, when flexible printed circuitry (FPC) antenna array is used, both are integrated together, the antenna array and the induction-collection printed circuit are formed by etching at one time.

The components of the control circuit are mounted on a printed substrate which is separated from the induction layer, the output of the antenna array of the induction layer is connected to the corresponding input terminal on the printed substrate by means of pressure-connection, plug-in connection or welding-connection.

Figure 9:
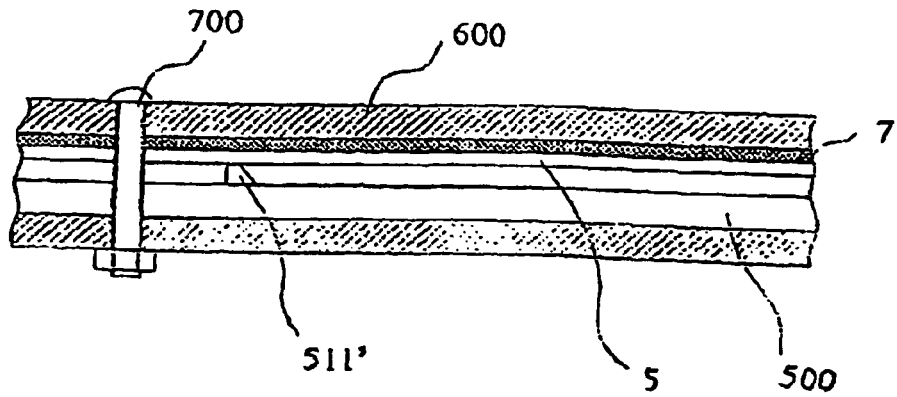
FIG. 9 is a diagram showing the connection between the output of the antenna array and the corresponding input terminal of the printed substrate (or electrical connection means) according to the present invention.

The specific connection mode is as shown in FIG. 9, therein the output of the antenna array of the induction layer is positioned between hard sheet 600 and printed substrate 500. The buffering layer 7 is provided between the hard sheet 600 and the output of the antenna array. The hard sheet 600, buffering layer 7 and the output of the antenna array are overlaid on the printed substrate 500 by means of the screwing-conjunction of the screw 700. The output of the antenna array is connected with the corresponding input terminal 511' of the printed substrate 500.

The printed substrate may be the printed substrate of the display screen control circuit in the body of the display screen. Therefore, the control components can be concentrated, the number of module can be reduced, and the cost can be cut.

The printed substrate may be the printed substrate of the display screen control circuit outside the body of the display screen, or a self contained unit, otherwise it may be set on the main board of PC. The connection between them is achieved by line or cable.

Figure 8:
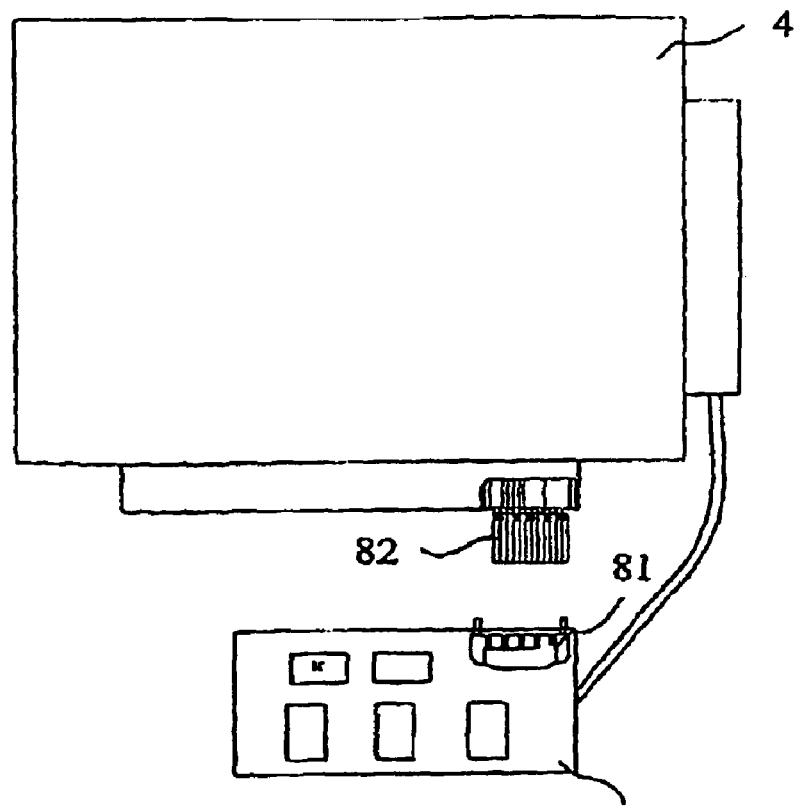
FIG. 8 is a diagram showing the connection between the induction layer and the control circuit which are separated according to the present invention.

The induction control circuit is positioned outside the body, and connected to the body through the electrical connection means. The output of the antenna array of the induction layer is connected with the output interface of the induction layer by means of pressure connection, plug-in connection, or welding-connection. On the control circuit, an interface which can match the electrical connection means of the induction layer is provided. The specific connection mode is shown in FIG. 8. The components of the induction-collection control circuit can be also provided on the printed substrate 8 which is separated from the induction layer 4 but integrated with the display screen control circuit. Certainly, they can be provided outside the body of the display screen, for example, they can be set in a PC. The output 82 of the antenna array of the induction layer is connected with the corresponding input terminal 81 of the printed substrate by means of pressure connection, plug-in connection or welding-connection. The connection interface may be the existing universal standard interface, for example, the output interface 82 of the induction layer and the interface 81 of the control circuit may be one of the following: pin-type connection means, flexible printed circuitry means, PIN-PIN connection means, welding spot (VGA) thermal-melted connection means, ultrasonic welding device, solder-plate welding device, puncture-type connection means.

Figure 7:
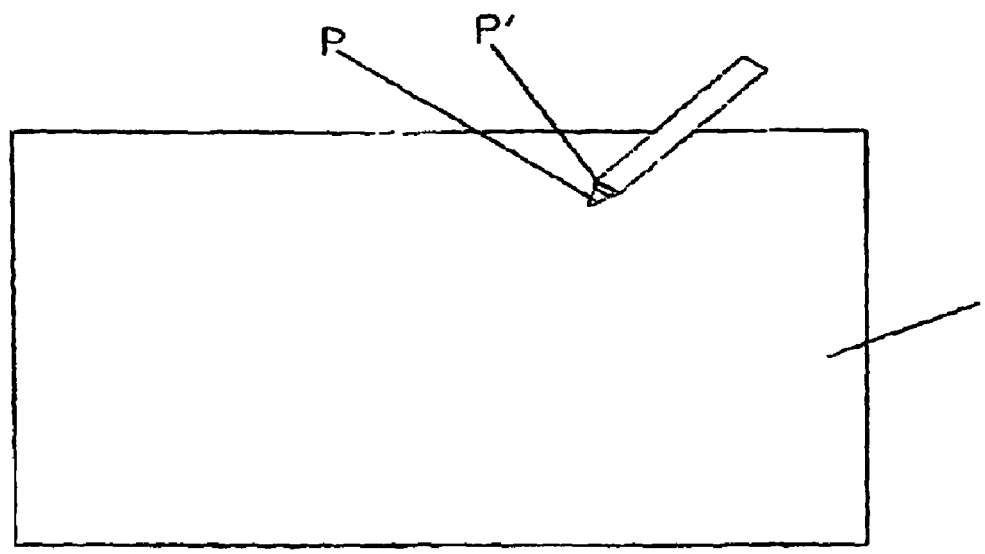
FIG. 7 is a diagram showing the principle of the generation of the induction signal and identification of the input touch location.

The touch-control mechanism of the present invention is as shown in FIG. 7. In FIG. 7, P is the signal input terminal of the pen, and there is a bigger conductor p' on the head of the pen. The electromagnetic pen transmits electromagnetic signal continuously. When pen-point touches the induction generation device, said electromagnetic signal passes through the induction antenna at the corresponding location, then the antenna at this location induces a signal. The location signal induced by the induction generation device is transferred to the input terminal of the control identification circuit through the wire lead on X, Y direction. After array strobe, control process, bandpass filter, detection-rectification and A/D conversion, the resultant location signal is transferred to the processing circuit and calculated by the CPU, so as to determine the location coordinates of the electromagnetic signal on the induction antenna and various operation statuses. Above data or information is sent to a computer, whereby to control the computer to identify, display, record and so on.

Furthermore, in order to obtain the pressure of pen-point as writing and to improve the induction accuracy of the location signal, a Z-axis directed pressure sensor is provided in the tail of the pen-point, and the output of the sensor is connect to the control terminal of the electromagnetic wave generation device. So the transmitted electromagnetic wave signal can be changed by the pressure-touching, thereby the pressure (input signal) of the pen-point can be identified more reliably.

Figure 10:
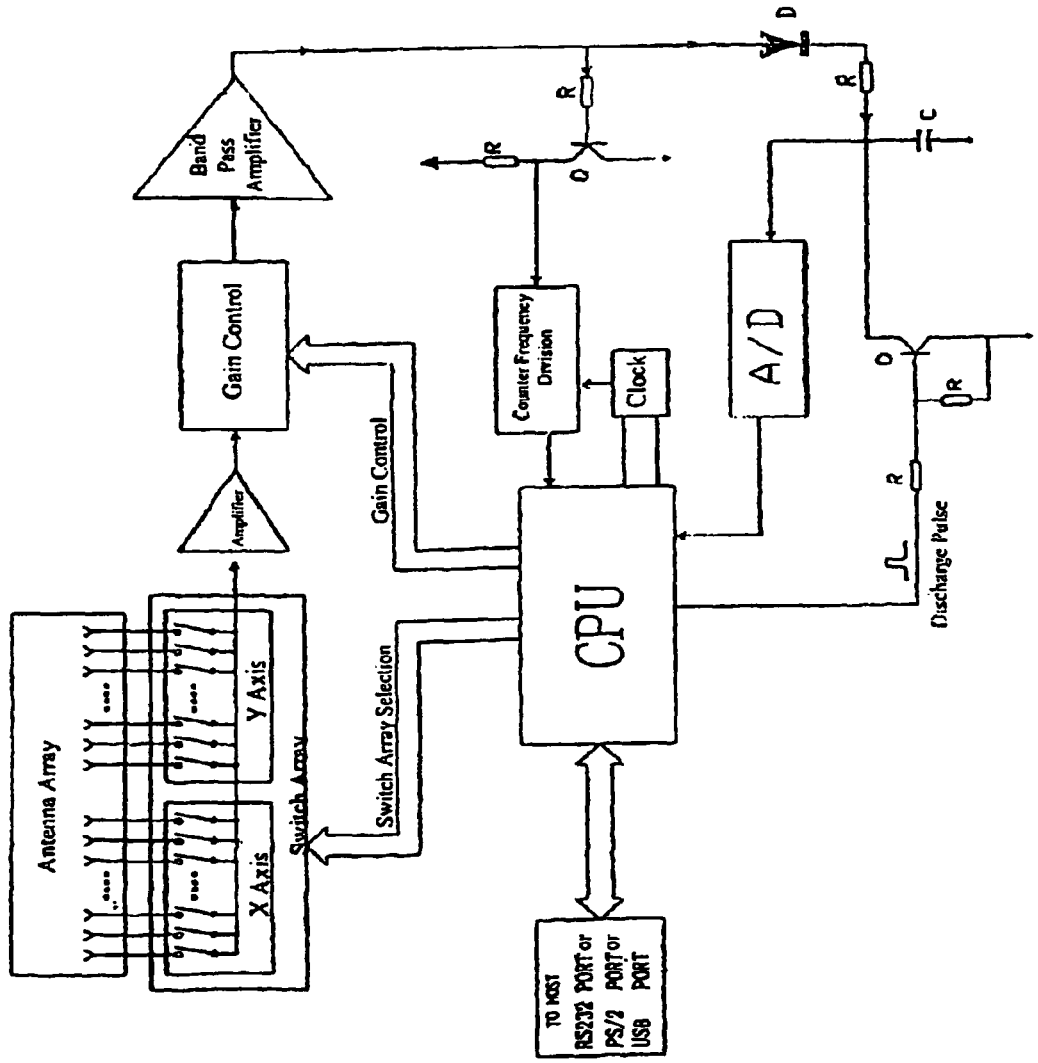
FIG. 10 is a diagram showing the identification circuit according to the present invention.

As shown in FIG. 10, the electromagnetic operating-pen is the electromagnetic signal resource for induction, when the devise according to the present invention is in use. The electromagnetic handwriting operating-pen transmits frequency-fixed signal or data electromagnetic signal continuously. When the pen-point is pressed and touched, the electromagnetic field passes through the antenna array, and the electromagnetic signal is induced by the corresponding underlayer horizontal antenna and top-layer vertical antenna in the center and neighborhood of the electromagnetic signal resource. The electromagnetic signal is transferred to CPU via identification circuit interface. The CPU calculates and compares the location and voltage value of the induction antenna, frequency signal changes, and determines the location of the electromagnetic signal resource and various operation statuses, then transfers the result to PC so as to control the PC to perform various operation commands. Said operation is, for example, identifying for character or pattern, drawing and calling for shortcut key, and so on.

The electromagnetic pen transmits electromagnetic signal continuously. When pen-point touches the induction generation device, said electromagnetic signal passes through the induction antenna at the corresponding location, then the antenna at this location induces a signal. The location signal induced by the induction generation device is transferred to the input terminal of the control identification circuit through the wire lead on X, Y direction. After array strobe, control process, bandpass filter, detection-rectification and A/D conversion, the resultant location signal is transferred to the CPU of the processing circuit to calculate, so as to determine the location coordinates of the electromagnetic signal on the induction antenna and various operation statuses. Above data or information is sent to a computer, whereby to control the computer to identify, display, record and so on.

Furthermore, in order to obtain the pressure of pen-point as writing and to improve the induction accuracy of the location signal, a Z-axis directed pressure sensor is provided in the tail of the pen-point, and the output of the sensor is connect to the control terminal of the electromagnetic wave generation device. So the transmitted electromagnetic wave signal can be changed by the pressure-touching, thereby the pressure (input signal) of the pen-point can be identified more reliably.

The present invention can be widely applied to various touch control equipment. Meanwhile, the idea of the present invention is not limited in the incorporation of the electromagnetic induction layer and flat display screen, but the electromagnetic induction layer can be provided in the rear of other non-CRT display screen, such as nonplanar plasma display screen and nonplanar liquid-crystal display screen with various profile, so as to realize the touch screen with low cost.

The invention claimed is:

1. A touch control display screen with built-in membrane antenna array lattice electromagnetic induction layer, including at least a display screen and a shell; wherein an induction layer is provided in the rear of the display screen, an output of the induction layer is connected to an induction control circuit, a display screen control circuit is also provided in the shell, wherein:
said induction layer is an antenna array formed by silver-plasm or mixture of silver-plasm and carbon-plasm which is printed on an insulation membrane and arranged along X, Y axes, therein the area enclosed by each lattice unit of the antenna array constitutes one induction cell;
said insulation membrane is made by film material;
there are two or more said induction layers, and the induction cells on respective induction layers are set to interlace each other;
a shield layer is provided after the induction layer; and
a buffering layer is further provided between the induction layer and the shield layer in order to keep a space between the induction layer and the shield layer.

2. The touch control display screen with built-in membrane antenna array lattice electromagnetic induction layer according to claim 1, wherein said induction layer is printed on two opposite surfaces of the insulation membrane, or printed on one surface of the insulation membrane, and there are two layers of the insulation membrane in which one is overlaid on the other.

3. The touch control display screen with built-in membrane antenna array lattice electromagnetic induction layer according to claim 1, the induction control circuit is mounted on a printed substrate which is separated from the induction layer, the output of the induction layer is connected to a corresponding input terminal on the printed substrate by means of pressure-connection, plug-in connection or welding-connection.

4. The touch control display screen with built-in membrane antenna array lattice electromagnetic induction layer according to claim 3, wherein said output of the induction layer is positioned between a hard sheet and the printed substrate; the buffering layer is provided between the hard sheet and the output of the induction layer; the hard sheet, the buffering layer and the output of the antenna array are overlaid on the printed substrate by means of the screwing-conjunction.

5. The touch control display screen with built-in membrane antenna array lattice electromagnetic induction layer according to claim 4, wherein said printed substrate is the printed substrate of the display screen control circuit in the body of the display screen.

6. The touch control display screen with built-in membrane antenna array lattice electromagnetic induction layer according to claim 4, wherein said printed substrate is the printed substrate of the display screen control circuit outside the body of the display screen, or a self contained unit.

7. The touch control display screen with built-in membrane antenna array lattice electromagnetic induction layer according to claim 1, wherein said induction control circuit is positioned outside the body of the display screen, and connected to the body of the display screen through electrical connection means; the output of the induction layer is connected with an output interface of the induction layer by means of pressure connection, plug-in connection, or welding-connection; an interface which matches the electrical connection means of the induction layer is provided on the control circuit.

8. The touch screen with built-in wire lattice electromagnetic induction layer according to claim 7, wherein said output interface of the induction layer and the interface of the control circuit are one of the followings: pin-type connection means, flexible printed circuitry means, PIN-PIN connection means, welding spot (VGA) thermal-melted connection means, ultrasonic welding device, solder-plate welding device, puncture-type connection means.

9. The touch control display screen with built-in membrane antenna array lattice electromagnetic induction layer according to claim 1, a protecting layer is provided in front of said display screen.

10. The touch control display screen with built-in membrane antenna array lattice electromagnetic induction layer according to claim 1, characterized by: the said display screen is a plasma display screen or a liquid-crystal display screen.

* * * * *